United States Patent [19]
Terada et al.

[11] Patent Number: 5,095,399
[45] Date of Patent: Mar. 10, 1992

[54] DIFFERENTIAL PROTECTIVE RELAY APPARATUS

[75] Inventors: Makoto Terada, Tokyo; Yosuko Tsujikura, Hyogo, both of Japan

[73] Assignee: Mitsubishi Denki Kabushiki Kaisha, Tokyo, Japan

[21] Appl. No.: 564,819

[22] Filed: Aug. 9, 1990

[30] Foreign Application Priority Data

Aug. 30, 1989 [JP] Japan .................... 1-224118

[51] Int. Cl.⁵ .................... H02H 3/08; H02H 3/52
[52] U.S. Cl. .................... 361/93; 361/65; 361/44; 361/45
[58] Field of Search .................... 361/93, 62, 65, 44, 361/45, 86, 192, 193, 113, 78, 146

[56] References Cited

U.S. PATENT DOCUMENTS

| | | | |
|---|---|---|---|
| 4,513,344 | 4/1985 | Usui | 361/113 |
| 4,991,052 | 2/1991 | Terada | 361/65 |

*Primary Examiner*—A. D. Pellinen
*Assistant Examiner*—S. Jackson
*Attorney, Agent, or Firm*—Rothwell, Figg, Ernst & Kurz

[57] ABSTRACT

A differential protective relay apparatus is switched over between a current differential mode and a voltage differential mode automatically by both even-order harmonic components of an imput applied to a differential circuit and a voltage across an impedance of the differential circuit, thereby to cover extensive fault modes while retaining high minimum pickup sensitivity, furthermore, devised against excessive fault voltages in the voltage differential mode, and, consequently, advantageous in insulation withstand capability.

9 Claims, 7 Drawing Sheets

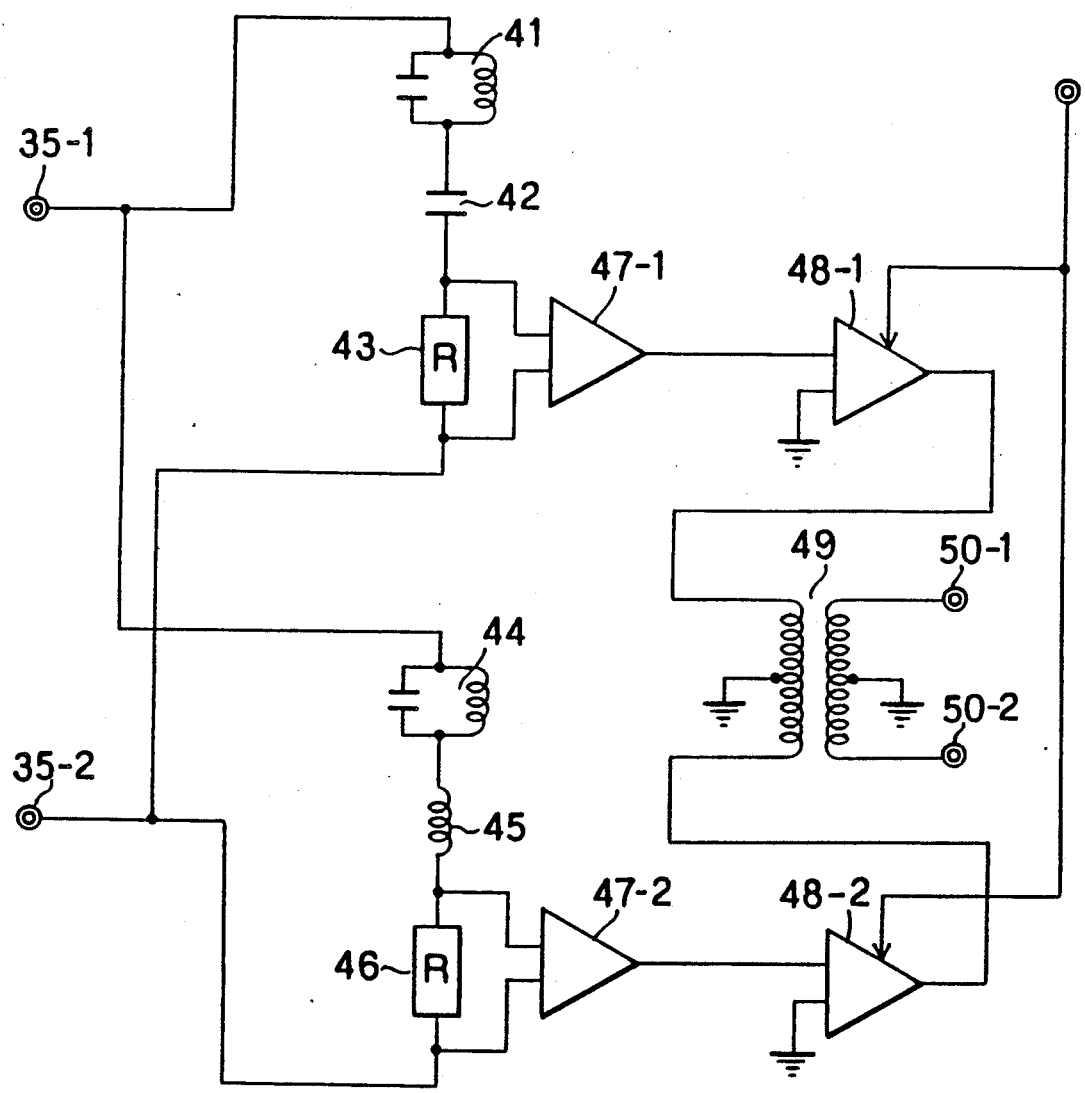
F I G. 6

DIFFERENTIAL PROTECTIVE RELAY APPARATUS

BACKGROUND OF THE INVENTION

1. Field of the Invention

The present invention relates to a differential protective relay apparatus which differentially protects a multiple-branch bus bar having a plurality of terminals through current transformers each provided on the terminals respectively.

2. Description of the Prior Art

FIG. 1 shows a connection diagram of a power system to which a differential protective relay apparatus is applied. In the figure, indicated by 0 is a bus bar, 1 to n are terminals of the bus bar 0, 11 to 1n are current transformers (will be termed CTs hereinafter) provided for the terminals 1 to n, 20 is a differential circuit which is a parallel connection of the secondary circuits of the CT11 to CT1n, and $Z_D$ is the impedance of a differential relay 87 connected between terminals 20-1 and 20-2 of the differential circuit 20.

Generally, differential protective relay apparatus are categorized into two types of a high-impedance differential system and low-impedance differential system depending on the selected value of a high or low impedance $Z_D$ between the terminals of the differential circuit 20.

In the former high-impedance differential system, the differential circuit is shunted by a relatively high impedance $Z_D$, and therefore it takes a little shunted current components from the current transformers CT11 to CT1n with differential connection and a little transferred energy from them. Accordingly, when currents flow in the same direction toward the differential circuit 20 on an internal fault, a relatively high voltage appears across the terminals of the differential relay 87 of the differential circuit 20. On the other hand, in case currents circulate through the CT11 to CT1n in differential connection on an external fault, voltage drops across the lead wire resistances of the secondary circuits of the CT11 to CT1n in differential connection are applied to the excitation impedance of the external fault current flow-out CT, and the terminal voltage does not exceed a certain voltage value determined by the CT excitation characteristics.

The low-impedance differential system introduces a great amount of shunted current components from the CT11 to CT1n with differential connection to the differential relay 87 of impedance $Z_D$, and most of energy is transferred to the differential circuit. Accordingly, an internal fault does not result in the induction of a high voltage across the differential relay 87 of the differential circuit 20. On the other hand, upon application of the voltage drops across lead wire resistances of the secondary circuits of the CT11 to CT1n at an external fault, the impedance $Z_D$ of the differential circuit 20 becomes equal to or lower than the secondary excitation impedance of CT1n of the external fault current flow-out terminal, resulting possibly greater flow-in current to the differential relay 87 of the differential circuit 20. On this account, the low impedance differential system is prone to malfunction on an external fault current.

The former high-impedance differential system will further be examined in the following. Generally, assuming that $R_D$ is a resistance of a differential circuit and $R_2$ is a total resistance the secondary circuits of CTs (secondary winding resistance $R_S$ plus secondary lead wire resistance $R_L$ of CTs), the maximum external fault current $I_{FE}$ max causes an apparent differential circuit current $I_D$ and differential circuit voltage $V_D$ as follows.

$$I_D \leq \frac{R_2}{R_D + R_2} I_{FE} \text{ max} \quad (1.1)$$

$$V_D \leq \frac{R_D R_2}{R_D + R_2} I_{FE} \text{ max} \quad (1.2)$$

If $R_D >> R_2$, the differential circuit voltage becomes:

$$V_D \leq R_2 I_{FE} \text{max} \ldots \quad (1.3)$$

and it does not exceed a certain voltage value.

On an internal fault, the minimum internal fault pick-up current is given in terms of the voltage $V_S$ appearing across the impedance $Z_D$, the secondary excitation current $I_{ex}(V_S)$ for the applied voltage $V_S$, and the number n of terminals connected to the bus bars, as follows.

$$I_F \text{ min} = \frac{V_S}{R_D} + n \cdot I_{ex}(V_S) \quad (1.4)$$

The conventional high-impedance differential protective relay schemes have the foregoing arrangement and operation, involve the following problem to be overcome. Although, with the intention of preventing the malfunctioning, the differential relay can be set to a value lower than that given by the formula (1.3) on external faults, the minimum pick-up current on internal faults is limited to the value given by the formula (1.4) as long as the relay being set in compliance with the formula (1.3). Namely, when a large number of terminals are connected to the bus bar O and the internal fault current is small, the minimum pick-up sensitivity of fault detection adversely varies by both the secondary excitation characteristics $I_{ex}-V_{ex}$ of the CTs and the number n of terminals.

SUMMARY OF THE INVENTION

The present invention is intended to solve the foregoing prior art problem, and its prime object is to provide a differential protective relay apparatus which allows the setting with wide latitude so that even a small internal fault current can surely be detected.

Another object of this invention is to prevent the insulation of the CT secondary circuit from being jeopardized.

In order to achieve the above objects, a bus bar differential protective relay apparatus according to one aspect of this invention comprises a first switching over circuit which switches an impedance of a differential circuit on the basis of a functional value between a fundamental component and even-order harmonic components in an input of the differential circuit 20, a plurality of voltage detecting elements for detecting a terminal voltage of the differential circuit and a terminal voltage of the impedance, and an interlock circuit formed of the voltage detecting elements, for tripping a circuit breaker.

A bus bar differential protective relay apparatus according to another aspect of this invention further comprises a second switching over circuit which switches the impedance of the differential circuit in accordance with the terminal voltage of the impedance of differential circuit into another impedance different from that switched by the first switching circuit.

These and other objects and novel features of the present invention will become more apparent from the following detailed description taken in conjunction with the accompanying drawings.

BRIEF DESCRIPTION OF THE DRAWINGS

FIG. 6 is a block diagram showing a harmonic ratio discrimination circuit; and

DETAILED DESCRIPTION OF THE PREFERRED EMBODIMENTS

An embodiment of this invention will be described with reference to the drawings. First, the operational principle at the occurrence of a system fault will be explained, separately for the cases of an external fault and internal fault.

(a) Heavy external fault

Figure 1:
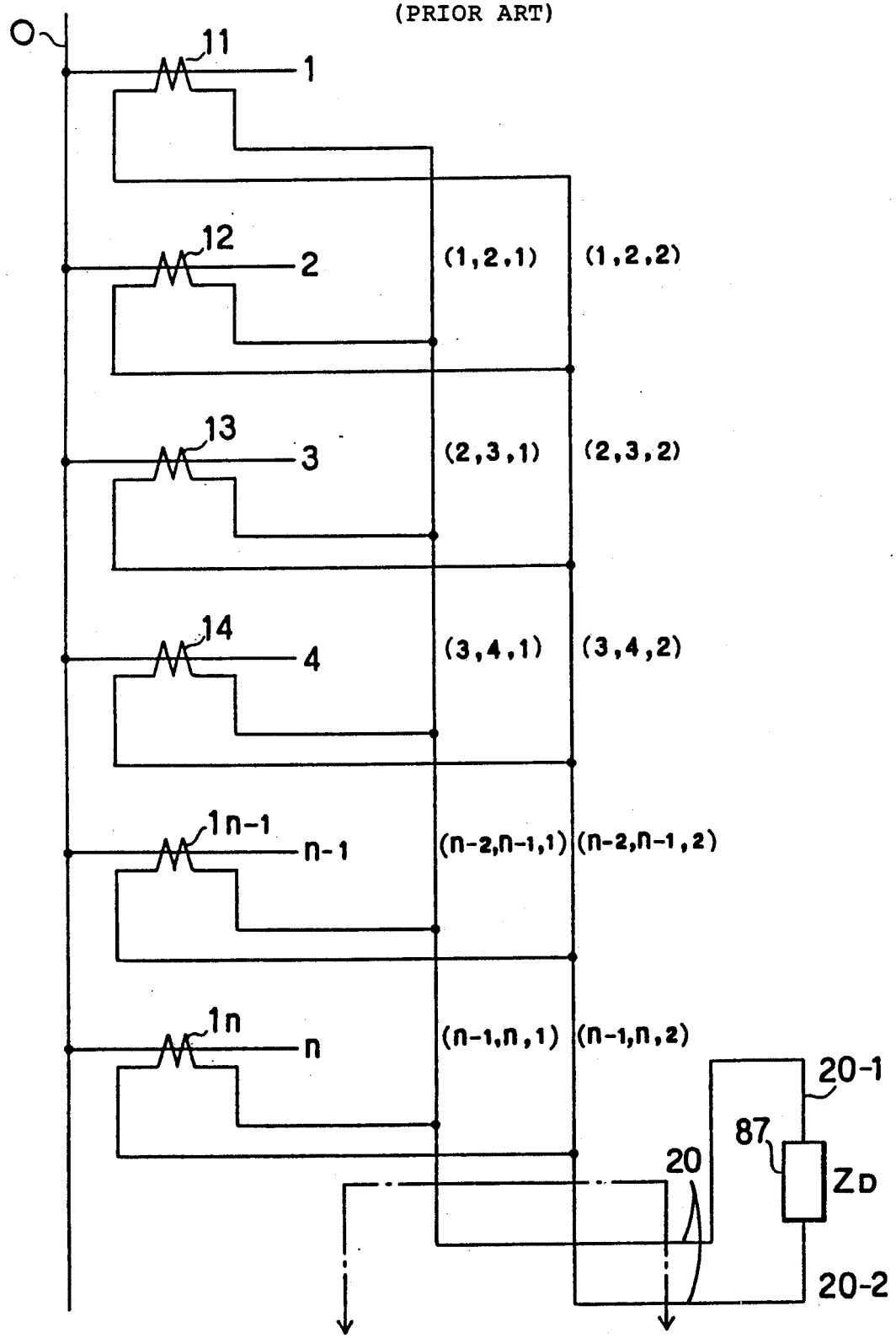
FIG. 1 is a connection diagram of a power system to which the present invention is applied.
Figure 2:
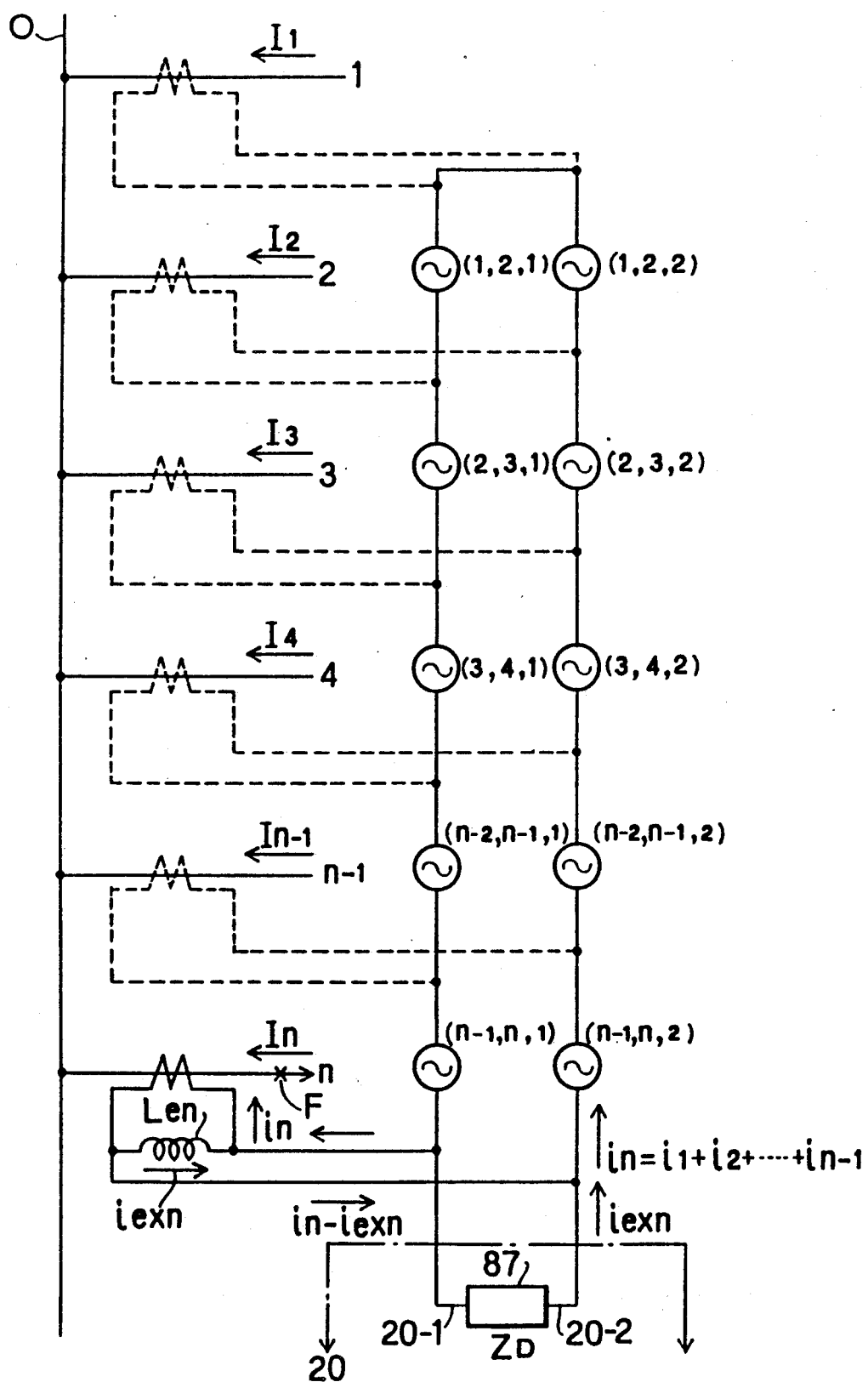
FIG. 2 is a diagram explaining the principle of the inventive apparatus in the event of an external fault.

In the event of a heavy external fault, currents $I_1$, $I_2$, $I_{n-1}$ from the terminals 1 to $n-1$ flow through the bus bar O toward a fault point F on the terminal n, and a current $I_n$ ($I_n = I_{FE}$) flows out of the terminal n, as shown in FIG. 2.

Current transformers CT11 to CT(1n-1) of the terminals 1 to $n-1$ have each a winding resistance and secondary lead resistance, with voltage drops across the respective resistances being shown by (1, 2, 1), (1, 2, 2), ..., (n-1, n, 2) as equivalent circuits in FIG. 2. Consequently, the following differential circuit voltage $V_D$ appears across the impedance of the differential circuit 20, as is generally known in the art.

$$V_D \leq I_{FE}(R_S + R_L)/N \quad\quad (2.1)$$

where N is a CT winding ratio, $I_{FE}$ is an external fault current (in terms CT secondary), $R_S$ is a secondary winding resistance of CT, and $R_L$ is a sum of secondary lead resistances of CTs.

(b) Minimum internal fault

Figure 3:
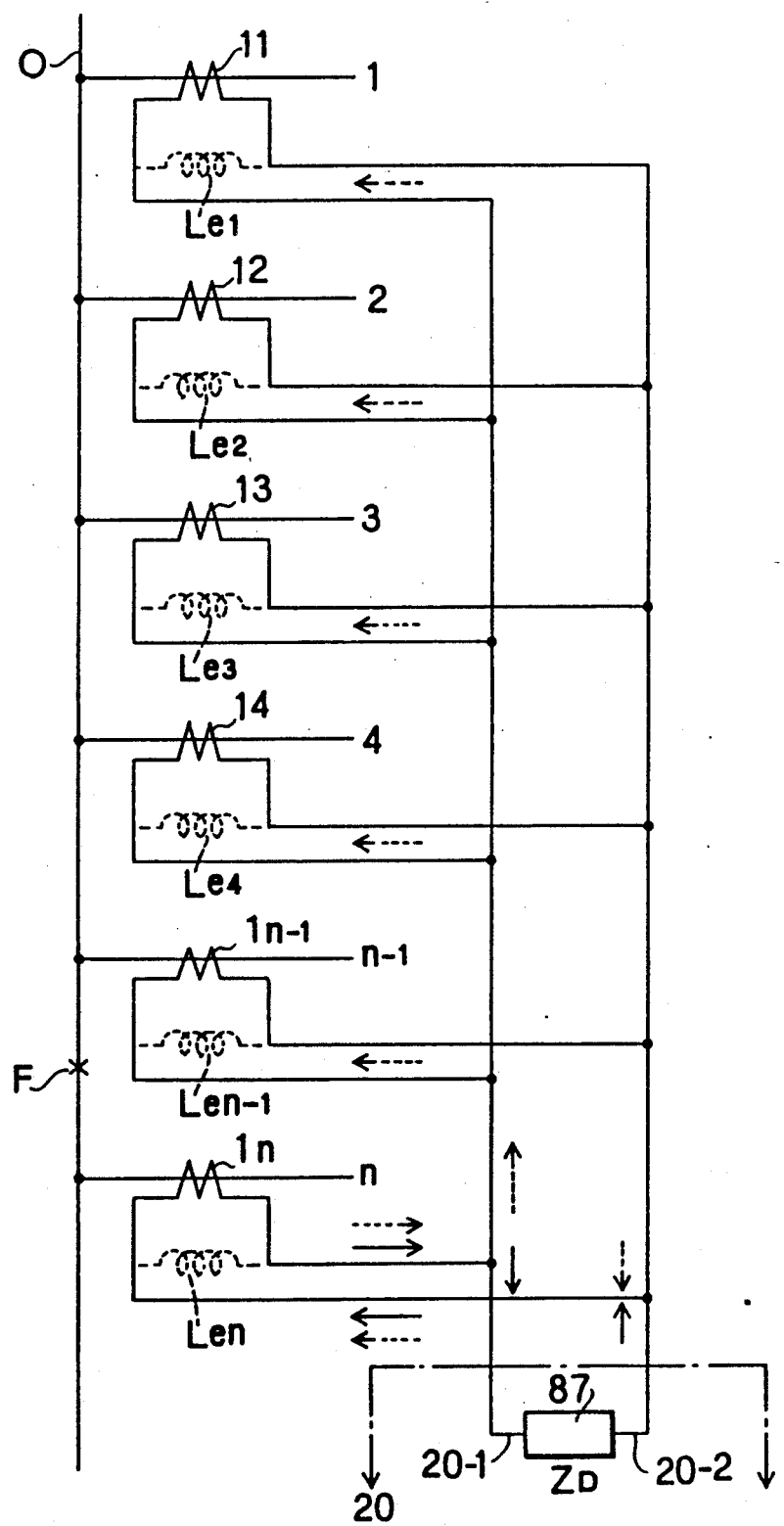
FIG. 3 is a diagram explaining the principle of the inventive apparatus in the event of an internal fault.

In the event of a fault at point F on the bus bar O, the current distribution can be shown by solid arrows and dashed arrows in FIG. 3. In this case, the detection sensitivity is minimum, and this value in terms of CT primary $I_{F1}$ is given by:

$$I_{F1}/N = n \cdot f_e(V_D) + g_Z(V_D) \quad\quad (2.2)$$

where $i_e = f_e(V_D)$ is a function determined by the CT secondary excitation characteristics, $i_R = g_Z(V_D)$ is a function determined by the impedance characteristics of the differential relay 87, and n is the number of terminals.

Generally, it is not easy to alter the value of the function $i_e = f_e(V_D)$, which is dependent on the CT secondary excitation characteristics, after manufacturing, while the impedance of the differential relay 87 can be altered. Although values given by the function of $i_R = g_Z(V_D)$ can be made sufficiently small usually, the CT secondary excitation current determined by the function of $i_e = f_e(V_D)$ becomes not negligible in case that the differential circuit voltage $V_D$ for internal fault detection is as high as 100 volts or more, affecting the minimum pickup on internal fault in terms of CT primary. In order to avoid this influence, it is necessary to have the impedance characteristics of $i_R = g_Z(V_D)$ so that the differential relay 87 can operate even under a lower differential circuit voltage $V_D$, and to make a leakage component, i.e., the CT secondary excitation current expressed by $i_e = f_e(V_D)$, as small as possible.

Figure 4:
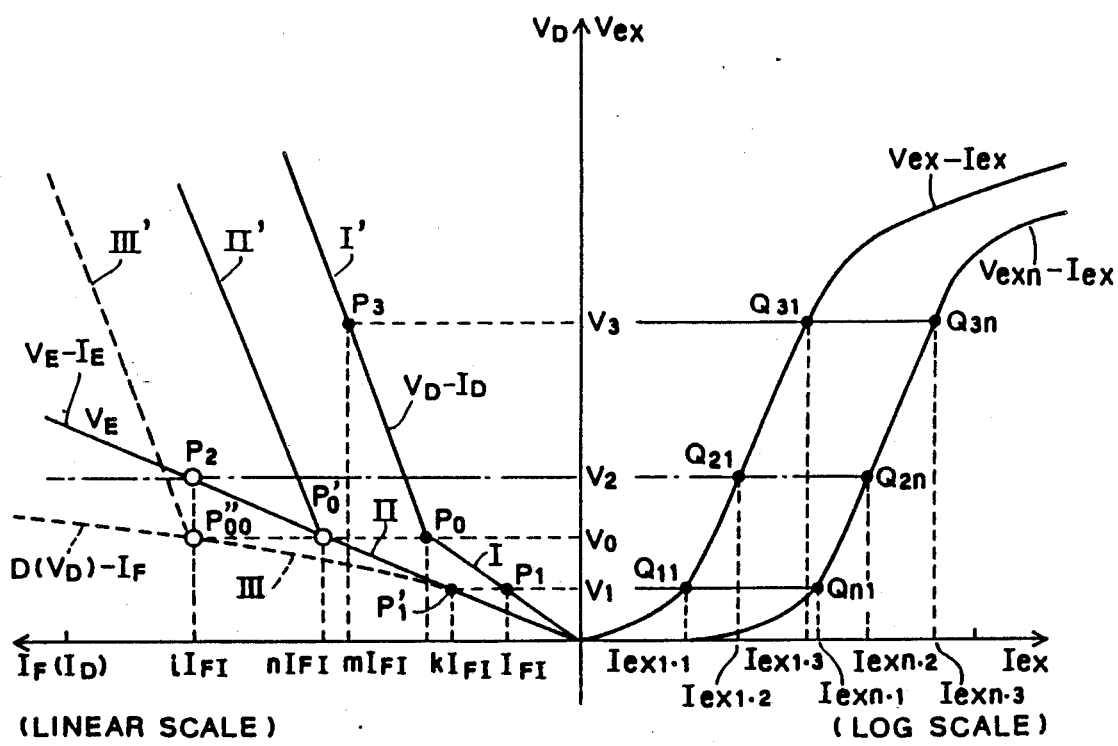
FIG. 4 is a graph explaining fundamental characteristics of the inventive apparatus.

Next, the fundamental characteristics of the foregoing differential protection will be described in connection with FIG. 4. In FIG. 4, the differential circuit voltage $V_D$ and CT secondary excitation voltage $V_{ex}$ are plotted along the vertical axis, and the fault current $I_F$ and CT secondary excitation current $I_{ex}$ are plotted leftward and rightward, respectively, along the horizontal axis. The operating characteristics of the differential relay 87 is expressed by $V_D - I_D$, the CT secondary excitation characteristics is expressed by $V_{ex} - I_{ex}$, and the excitation characteristics of a parallel connection of n CTs each having the $V_{ex} - I_{ex}$ characteristics is expressed by $V_{exn} - I_{ex}$.

The following describes the operation principle based on the above setup of characteristics, separately for each type of fault.

(i) Detection on internal fault

In the operating characteristics $V_D - I_F$ of the differential relay 87 shown in the left-hand part of FIG. 4, the slope section of resistance $R_{D1}$ of the differential circuit is the object of concern. The resistance $R_{D1}$ of the differential circuit is selected to be of a relatively low value on the order of ohms. When a fault current $I_F$ flows in and the differential voltage $V_D$ reaches to the minimum pickup voltage $V_1$, the differential relay 87 operates. The current in terms of the system primary side $I_{F1}$ is equal to the minimum pickup current $I_{F1}$ min in the case of a single CT, but if there are unused terminals of n in number each connected to a CT, the differential voltage is applied to the secondary of n CTs in parallel connection and the current becomes as follows.

$$I_F \min = I_{F1} + I_{exn.1} \quad\quad (2.3)$$

where $I_{exn.1}$ is the CT secondary excitation current at the minimum pickup differential voltage $V_1$ when n CTs connected in parallel.

By choosing a low minimum pickup differential voltage $V_1$, the current in terms of system primary side $I_{F1}$ and $I_{exn.1}$ for the voltage $V_1$ become sufficiently small, and the degradation of the fault detection sensitivity due to the parallel connection of n CTs can be under control within a certain range. Namely, the gradient of the operating characteristics $V_D - I_F$ of the differential relay 87 is made small so that differential circuit voltage $V_D$ at the minimum pickup can be set small. This results in a smaller CT secondary excitation current, and the higher sensitivity performance is accomplished by operating the CTs in lower magnetic flux density. Consequently, the variation range of minimum pickup due to the variation in the number of terminals connected to the bus bar 0 can be suppressed below a certain safety threshold in a practical sense.

(ii) Prevention of malfunctioning at maximum external fault

Generally, when n terminals 1 to n are connected to the bus bar O, the differential circuit voltage $V_D$ appearing across the impedance $Z_D$ of the differential circuit at the occurrence of an external fault on the terminal n, as shown in FIG. 2, is expressed by the above formula (2.1). By plotting the differential circuit voltage $V_D$ equal to $V_2$ on the graph of FIG. 4 to determine a $V_3$ with a certain marginal factor over the $V_2$, the differential voltage detecting elements that are designed to operate at the level of $V_3$ do not malfunction even during the maximum external fault current on the terminal n.

In this case, the internal fault current for producing a voltage of $V_3$ takes a value of $mI_{F1}$ which compares with point $P_3$ in FIG. 4. The CT secondary excitation current varies between $I_{ex1.3}$ and $I_{exn.3}$. As a result, the system minimum pickup current (in terms of CT secondary) $I_F$, seen from the CT secondary side will have the following variation range.

$$mI_{F1} + I_{ex1.3} \leq I_F' \leq mI_{F1} + I_{exn.3} \cdots \quad (2.4)$$

In conclusion, the minimum pickup varies depending on the magnitude of the CT secondary excitation current corresponding to the CT differential circuit voltage and the number of terminals.

(iii Overall operation

As mentioned previously, between the minimum internal fault and maximum external fault, there are two kinds of internal fault current detected values, i.e., $I_{F1}$ and $mI_{F1}$, in correspondence to the magnitude of the differential circuit voltage $V_D$.

In order to obtain these two operating values, the differential protective relay apparatus proposed previously by the applicants of the present invention in U.S. patent application Ser. No. 438,109, filed Nov. 20, 1989, now U.S. Pat. No. 4,991,052 (hereinafter will be termed simply former patent application) is designed to choose a proper impedance switching voltage $V_0$ as follows.

$$\left. \begin{array}{ll} V_D = R_{D1}I_F & (V_D \leq V_0) \\ V_D = R_{D2}I_F + (R_{D1} - R_{D2})I_{F1} & (V_D \geq V_0) \end{array} \right\} \quad (2.5)$$

where $I_{F1} = V_0/R_{D1}$.

The value of the impedance switching voltage $V_0$ is selected to be $kI_{F1}$ for a fault current $I_{F1}$ and, at the same time, to be equal to the minimum pickup differential voltage $V_1$ at which a high-sensitivity differential current detecting element having the low impedance $R_{D1}$ operates, or alternatively it is selected to be a proper value below $mI_{F1}$ corresponding to the voltage $V_3$. As a result, switching of the differential circuit takes place from impedance $R_{D1}$ to $R_{D2}$ at a level of relatively low differential circuit voltage $V_D$, and it has a wide current range in which the differential circuit impedance takes the higher value $R_{D2}$.

In contrast, the present invention is intended to have a wide current range in which the differential circuit impedance takes the lower value $R_{D1}$, and this will be described in brief in the following.

The present invention intends to utilize the presence of even-order harmonic components, such as the second harmonic, in the waveform of the differential circuit current (voltage) as a condition for switching the differential circuit impedance.

It is well known fact that in the current differential scheme with a relatively low differential circuit impedance, the CT is subjected to d.c. biased magnetization by a d.c. component of fault current during the medium fault current through the fault terminal in the event of an external fault, resulting in the occurrence of a d.c. saturation in which the magnetic flux in the core reaches the saturation level only on the side of one polarity. It is also known that the excitation current produced by the d.c. saturation of CT richly includes even-order harmonic components such as the second harmonic component in addition to a d.c. component, due to off-set fault current.

Accordingly, the differential circuit impedance $R_{D1}$ should be switched over to the higher value $R_{D2}$ only after the CT of the terminal from which the external fault current flows out has been saturated with the d.c. bias, and the second harmonic component and other even-order harmonic components have increased, and the magnitude of the harmonic components or its proportion relative to that of the sinusoidal fundamental component has exceeded a predetermined value. Since the second harmonic and other even harmonic components increase as the fundamental component of the fault current has increased, the detection of fault can be done by detecting the second and other even harmonic components in excess of a certain proportion level in case the effective sinusoidal fundamental component has a large value.

Indicated by I in the left-hand part of FIG. 4 is a dual slope characteristics of $V_D-I_D$, and II represents the relation between the error differential voltage $V_E$, which is produced across the differential circuit during the flowing of the external fault current $I_F$, and the fault current $I_F$. The slope of the $V_E$-$I_F$ characteristics does not exceed the slopes determined by the differential circuit impedance $R_D$ and the total resistance value of the CT secondary circuit, and therefore malfunction does not occur up to point $P_0'$ ($nI_{F1}$, $V_0$) in the figure. However, if the fault current reaches $II_{F1}$, the differential circuit voltage will reach $V_2$, and therefore the differential circuit impedance must have been switched over at $P_0'$ before reaching $P_2$. Namely, the $V_D-I_D$ characteristics is switched over at point $P_0$ on the dual slope characteristics I-I', and the impedance of the differential circuit will take the higher value $R_{D2}$ in a significantly wide range.

Even if the fault current $I_F$ increases, the difference $V_D$ resulting from the subtraction of the even harmonic components including the second harmonic component (inclusive of the d.c. component) from the fundamental component in the differential circuit voltage will increase as the fault current $I_F$ does, and therefore it is not proportional to the fault current $I_F$ as of the case where there is CT saturation, but develops a tendency as shown by the dashed line III in FIG. 4, for example.

In this invention, it is designed such that the switching over condition of the differential circuit impedance is done only in response to the flowing of a large fault current $II_{F1}$, by setting the switching over voltage $V_{DS}$ as follows.

$$V_{DS} = D(V_D) \qquad (2.6)$$
$$= D_1(I_{D1}) - D_2(I_{D2}, I_{D4}, \ldots I_{D2n}) \geq V_0$$

where $I_{D1}$ is the fundamental component of differential current corresponding to the differential circuit voltage $V_D$, and $I_{D2}, I_{D4}, \ldots, I_{D2n}$ are even-order harmonic components included in the differential current $I_D$, wherein the $V_D$, $I_D$, $I_{D1}$, $I_{D2}$, $I_{D4}$, and so on appearing in the differential circuit on an external fault are functions of the CT excitation characteristics, constants of CT secondary circuit and fault current $I_F$.

The CT excitation characteristics, which is a nonlinear characteristics due to the CT core saturation, cannot simply be formulated. An example of the result of analysis by using a simple model of CT characteristics is disclosed in publication "IEEE Transactions on Power Apparatus and Systems", Vol. PAS-104, No. 3, P. 678, FIG. A.1, March 1985. The foregoing discussion is summarized by formulas as follows.

$$\left. \begin{array}{l} V_D = R_{D1}I_F \qquad (V_D \leq V_0) \\ V_D = R_{D2}I_F + (R_{D1} - R_{D2})mI_{F1} \quad (V_D \geq V_0) \end{array} \right\} \quad (2.7)$$

$$V_D = (R_S + R_L)mI_{F1} \qquad (2.8)$$

$$I_{F1} = \frac{V_0}{R_{D1}} \qquad (2.9)$$

Namely, it is designed such that impedance switching over for the differential circuit is not based on the apparent differential circuit voltage, but the switching voltage is determined by the function $D(V_D)$ which is dependent on the hysteresis of the CT characteristics, so that the impedance of differential circuit is switched over from $R_{D1}$ to $R_{D2}$ only in the case of flowing a large external fault current $1I_{F1}$).

In the case of an internal fault, the current does not concentrate to one of CTs to cause it to be saturated, and therefore little hormonic components are created.

$$D(V_D) = D_1(I_{D1}) \qquad (2.10)$$
$$= V_D$$

Accordingly, the condition of minimum fault pickup is as follows.

$$\left. \begin{array}{l} D(V_D) \approx R_{D1}I_{F1} \geq V_1 \\ R_{D1}I_{F1} \geq V_1 \\ I_{F1} \geq \dfrac{V_1}{R_{D1}} \end{array} \right\} \quad (2.11)$$

In other words, a minimum pickup takes place on the line I of the $V_D$–$I_F$ characteristics, and the operation accompanied by the switching over to the high impedance section i.e., line I', on a heavy fault, is the case where the following relation is met; namely, at point $P_3(mI_{F1}, V_3)$ in FIG. 4.

$$R_{D2}I_{F2} \geq V_3 \ldots \qquad (2.12)$$

On an external fault, an error voltage $V_E$ appeared on the differentially connected CT secondary circuits is applied to the CT of the terminal at which the fault current flows out, and the error voltage $V_E$ appearing across the differential circuit is as follows.

$$V_D = V_E = (R_S + R_L)I_F$$

On a light external fault, the differential relay does not operate due to the following conditions.

$$D(V_D) \leq V_0 \ [\because \text{line III} < \text{line II} < \text{line I}] \qquad (2.13)$$

$$D(V_D) = D_1(I_{D1}) - D_2(I_{D2}, I_{D4}, \ldots, I_{D2n}) \leq$$

$$(R_S + R_L)I_F < R_{D1}I_F$$

In the case of a heavy external fault, the differential relay does not operate due to the following conditions.

$$D(V_D) \geq V_0 \ [\because \text{line III}' < \text{line II}' < \text{line I}'] \qquad (2.14)$$

$$D(V_D) \leq (R_2 + R_L)I_F < R_{D2}\left[I_F - \frac{V_0}{R_{D1}}\right] + V_0 <$$

$$R_{D2}I_F + V_0\left[1 - \frac{R_{D2}}{R_{D1}}\right]$$

Figure 5:
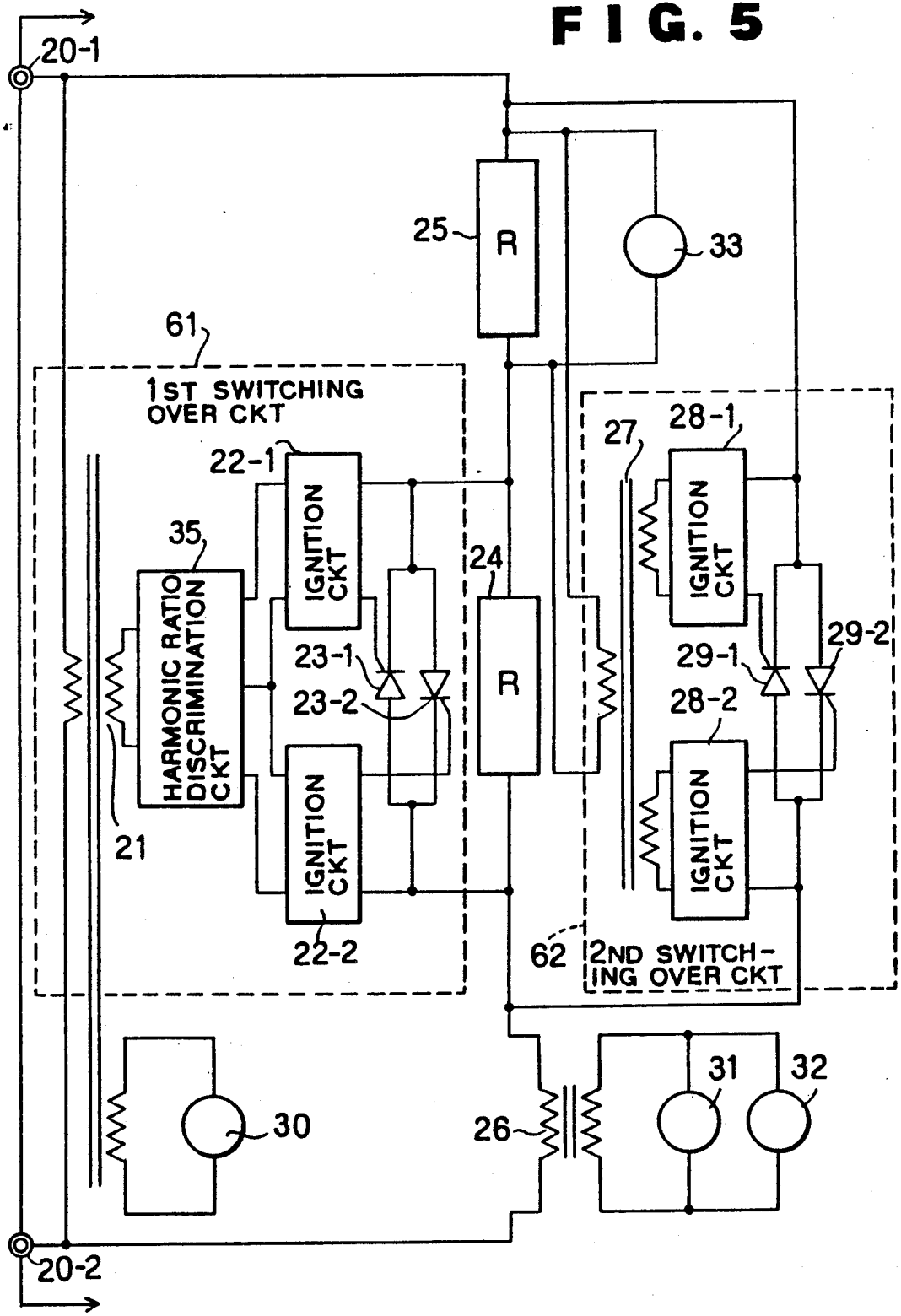
FIG. 5 is a block diagram showing an inventive differential relay.

The following explains an example of the arrangement of the foregoing differential relay 87 in connection with FIG. 5. In FIG. 5, indicated by 20-1 and 20-2 are terminals connected to the differential circuit 20, 21 is a voltage transformer which transforms the voltage across the terminals into a proper voltage level, 35 is a harmonic contents discrimination circuit which receives the secondary voltage of the voltage transformer 21 and compares the second harmonic component (and other even-order harmonic components if necessary) in the differential circuit voltage with its fundamental component, 22-1 and 22-2 are ignition circuits which receive the output of the harmonic contents discrimination circuit 35 to produce a voltage having a proper magnitude and pulse width and turn on or off semiconductor power switches of the following stage, and 23-1 and 23-2 are the semiconductor power switches which are triggered in response to the outputs of the ignition circuits 22-1 and 22-2 thereby to open or close voltage waves of complementary polarities, and are formed of GTO or SIT devices that becomes nonconductive by being triggered. Indicated by 24 is a resistor with its both ends being opened or short-circuitted by the semiconductor power switches 23-1 and 23-2, 25 is a resistor connected in series to the resistor 24, 26 is a current transformer having its primary winding connected in series to the resistors 24 and 25, and 27 is a voltage transformer which couples the voltage across the resistor 25 through its secondary windings to ignition circuits 28-1 and 28-2, which then control semiconductor power switches 29-1 and 29-2 (including SCRs which become conductive by being triggered) to latch.

Indicated by 30 is a voltage detecting relay element connected to a tertiary winding of the voltage transformer 21 and it responds to the magnitude of a voltage across the terminals 20-1 and 20-2. 31 is a voltage detecting relay element which detects a voltage transformed by the voltage transformer 26 and operates when a primary current of the voltage transformer 26 has reached a predetermined value in terms of the voltage between the terminals 20-1 and 20-2 thereby to generate a "1" signal (to close contacts). 32 is a harmonic detecting relay element which detects even harmonic components (particularly, the second harmonic) in the voltage transformed by the voltage transformer 26 and generate a "1" signal (to close contacts). 33 is a voltage detecting relay element which detects the magnitude of a primary voltage (current) transformed by the voltage transformer 27, and it operates when the CT secondary currents flowing from the terminals 20-1 and 20-2 are larger than a predetermined value thereby to form a proper short circuit so as to lower the impedance seen from the terminals 20-1 and 20-2 for the purpose of high-speed operation.

FIG. 6 is a block diagram showing the arrangement of the harmonic ratio discrimination circuit 35. In FIG. 6, indicated by 41 and 42 are a 2-terminal reactance filter which passes the fundamental component of the input between terminals 35-1 and 35-2 connected to the secondary winding of the voltage transformer 21 and blocks the second harmonic component, to output a passing current through the filter as a voltage drop across a resistor 43. 44 and 45 are a 2-terminal reactance filter which passes the second harmonic component and blocks the fundamental component, to output a passing current through the filter as a voltage drop across a resistor 46.

Indicated by 47-1 and 47-2 are insulating amplifiers for the output voltages of the resistors 43 and 46, and yield output voltages to phase shift circuits of the following stage. 48-1 and 48-2 are phase shift amplifying circuits which adjust the phase of the output voltages of the amplifiers 47-1 and 47-2 thereby to produce output voltages in synchronism with the frequency and harmonics of the power system. 49 is a current transformer which receives the outputs of the phase shift amplifiers 48-1 and 48-2 as a primary input, and outputs a secondary output $D(V_D)$ proportional to the difference of the primary input with a positive and negative polarities separately from its center-tapped secondary winding to terminals 50-1 and 50-2.

Figure 7:
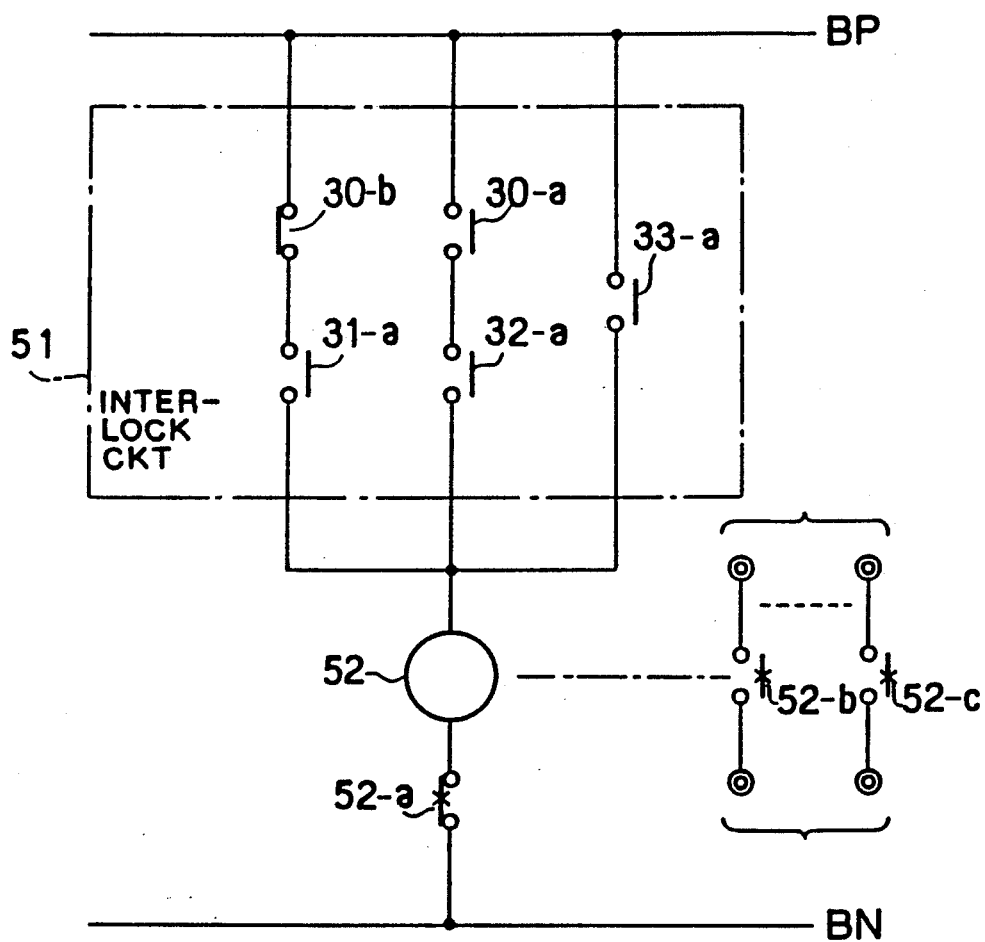
FIG. 7 is a schematic diagram of an interlock circuit.

The voltage transformer 21, harmonic ratio discrimination circuit 35, ignition circuits 21-1 and 21-2, and semiconductor power switches 23-1 and 23-2 in combination constitute a first switching over circuit 61 which switches the impedance of the differential circuit in accordance with the ratio of the even-order harmonic components to the fundamental component of the differential circuit input. Similarly, the voltage transformer 27, ignition circuits 28-1 and 28-2, and semiconductor power switches 29-1 and 29-2 in combination constitute a second switching over circuit 62 which switches the impedance of the differential circuit in accordance with the terminal voltage of the differential circuit impedance. The "0" or "1" (closed/open) signals produced by the operation of detecting relay elements 30, 31, 32 and 33 are delivered to a logic sequence circuit which forms an interlock circuit 51 for tripping a breaker as shown in FIG. 7. In FIG. 7, indicated by 52 is a lock-out relay for tripping breaker, 52-a through 52-c are auxiliary contact sets of the lock-out relay 52 of and 30-a, 30-b, 31-a, 32-a, and 33-a are contact sets of the detection relay elements shown in FIG. 5.

Next, the operation of the embodiment shown in FIG. 5 will be described.

(a) Light internal fault

On an internal fault, currents flow from the terminals 1 to n-1 toward a fault point F, and the differential circuit input is produced to the terminals 20-1 and 20-2. In this case, the input to the voltage transformer 21 includes relatively a little distortion, causing the harmonic ratio discrimination circuit 35 to produce a too small output to fire the ignition circuits 22-1 and 22-2, and the semiconductor power switches 23-1 and 23-2 remain closed to keep the resistor 24 short-circuitted. Accordingly, it is equivalently the insertion of a relatively low impedance $RD_1$ provided by the resistor 25 and current transformer 26 between the terminals 20-1 and 20-2, and consequently the differential relay operates as a low-impedance differential relay. If the detecting relay element 31 operates (close contact 31a) and the detecting relay element 30 does not operate (close contact 30b), the lock-out relay 52 is energized.

(b) Heavy internal fault

In this case, a large current is applied to the terminals 20-1 and 20-2, causing the ignition circuits 22-1 and 22-2 to produce large outputs, and the CT11 to CT(1n-1) of terminals 1 to n-1 are less likely to be saturated by the fault currents fed by the power source. Therefore, its even harmonic components $I_{D2}$, $I_{D4}$, ..., $I_{D2n}$ are small and the harmonic ratio discrimination circuit 35 produces a large output $D(V_D)$. This output provides a sufficiently large inputs for the ignition circuits 22-1 and 22-2, causing the semiconductor power switches 23-1 and 23-2, which receive the outputs of 22-1 and 22-2, to open anode circuit, and the resistor 25 is inserted in series to the resistor 24. Consequently, a series circuit made up of the resistors 24 and 25 and current transformer 26 has a high impedance, the impedance seen from the terminals 20-1 and 20-2 becomes also high, and the differential relay operates as a high-impedance differential relay.

In this case, large currents flow in from the CTs heavy and large voltage drop appears across the resistor 25, and the voltage applied to the voltage transformer 27 is also high. Consequently, the voltage transformer 27 produces an output large enough to fire the ignition circuits 28-1 and 28-2.

On receiving the outputs of the ignition circuits 28-1 and 28-2, the semiconductor power switches 29-1 and 29-2 become conductive alternately in every half cycle to short-circuit the resistors 24 and 25. As a result, the internal impedance seen from the terminals 20-1 and 20-2 becomes sufficiently low and the voltage of the differential circuit does not rise in excess, and it does not impairs the insulation of the CT secondary circuits connected to the differential circuit.

(c) Light external fault

Among the CTs connected differentially, the CT connected to the terminals where the external fault current flow out see the sum of the voltage drops along the secondary leads of CTs connected to the terminals where the fault currents are fed from the source behind. Since the fault current is small in this case, the voltage across the CT secondary lead wires are low and the voltage applied between the terminals 20-1 and 20-2 is also low. Accordingly, the harmonic ratio discrimination circuit 35 produces a small output $D(V_D)$, application of this small output upon the ignition circuits 22-1 and 22-2 cannot turn off the semiconductor power switches 23-1 and 23-2, and the resistor 24 is left short-circuitted. Therefore the differential relay operates as a low-impedance differential relay connected in series with the resistor 25 and current transformer 26. In this case, the output $V_D$ of harmonic ratio discrimination circuit 35 is small, causing the detection relay element 30 to be reset (closed contact 30b) and the detecting relay elements 31 and 32 to be also reset (open contacts 31a and 32a), and the lock-out relay 52 is not energized.

(d) Medium external fault

Similar to the above case, a voltage drop proportional to the sum of the currents flowing from the terminals where fault currents flow arises between the terminals 20-1 and 20-2, and this voltage drop is greater than the case of the preceding light external fault. The detecting relay element 30 may operate depending on the magnitude of the resulting differential circuit voltage $V_D$. Depending on the instant the occurrence of the fault, a d.c. component will appear, causing the CT of the terminal, from which the fault current flows out, to be d.c. saturated, and even harmonic components including the second harmonic are yielded in the excitation current, i.e., differential current. In response to the even harmonic components, the detecting relay element 31 stays reset due to its even harmonic discrimination and suppressing characteristics. Due to the reduction of the output with the existence of the even harmonic bias mentioned before, the harmonic ratio discrimination circuit does not increase its output directionally proportional to the magnitude of differential currents, but it produces sufficient output only when the fault current input applied to 30 is larger enough for the pick-up of 30, thus firing the ignition circuit 22-1 and 22-2. Then, the semiconductor power switches 23-1 and 23-2 are brought open and the resistors 24 and 25 are inserted in series to the circuit.

Namely, in contrast to the case of no harmonic ratio discrimination circuit 35 used (i.e., preceding patent application), the differential relay operates as a high-impedance differential relay only after the passage of a larger current. In other words, it attains a wider current range in which the inventive differential relay can operates as a low-impedance one than that of the preceding patent application. It operates as a low-impedance differential relay even in the range of medium external fault currents and never bring an unnecessary high value in impedance of the CT secondary circuit.

(e) Heavy external fault

With a large through fault current, the detecting relay elements 30 and 31 may operate. In common with the above case, the harmonic ratio discrimination circuit 35 also produces a large output, firing the ignition circuits 22-1 and 22-2 to produce sufficient outputs. Then, the semiconductor power switches 23-1 and 23-2 become open, and the differential relay operates as a high-impedance differential relay. Based on the operation as a high-impedance differential relay, by setting the detecting relay element 32 as sufficiently high relative to the differential circuit voltage $V_D$ appearing across the CT secondary lead wire, the element 32 is prevented from malfunctioning, as is known in the prior art.

The foregoing embodiment is an example of carrying out the present invention. Various other arrangements are possible, and they are, needless to say, included in the scope of this invention in its broadest aspect.

As described above, the inventive apparatus is arranged such that the impedance of the differential circuit is switched over in response to the terminal voltage of the differential circuit or the terminal voltage across the impedance so that the differential relay is operated in the high-impedance differential relay mode or low-impedance differential relay mode, whereby the advantages of these modes can be used complementally while avoiding their drawbacks.

Namely, differential protective relay apparatus based on one aspect of this invention is designed to detect even harmonic components in the differential circuit current which is observed in the event of an external fault and to switch over the impedance of the differential circuit in accordance with the contents of harmonics thereby to alter the switching over voltage, whereby the differential circuit impedance can be kept lower over a wide fault current range. In consequence, the differential relay has enhanced pickup sensitivity to internal fault detection.

The differential protective relay apparatus based on another aspect of this invention is designed to switch over an impedance of the differential circuit to a lower impedance in accordance with the terminal voltage across the impedance, whereby the voltage of the differential circuit does not rise in excess and it does not impair the insulation of the CT secondary circuits connected to the differential circuit.

What is claimed is:

1. A differential protective relay apparatus comprising: a plurality of terminals connected to a bus bar; current transformers each provided for said terminals respectively; a differential circuit connected in parallel to secondary windings of said current transformers; a first switching over circuit for switching over an impedance of said differential circuit based on a defined functional value determined by a fundamental component and even harmonic components of an input applied to said differential circuit; a plurality of voltage detecting elements each for detecting a terminal voltage of said differential circuit and a terminal voltage of said impedance; and a breaker tripping interlock circuit, including logically connected contacts to be made and broken by said voltage detecting elements, for tripping a breaker.

2. A differential protective relay apparatus according to claim 1, wherein said impedance of said differential circuit is formed out of a plurality of resistors and a primary winding of a voltage transformer connected in series.

3. A differential protective relay apparatus according to claim 2, wherein said first switching-over circuit comprises: a voltage transformer which transforms the differential circuit input; a harmonic ratio discrimination circuit which is connected to a secondary winding of said voltage transformer, discriminates a proportion of even harmonic components of the differential circuit input and produces a signal in response to the excess of said proportion over a predetermined value; an ignition circuit which produces an ignition signal in response to the output signal from said discrimination circuit; and a first switching device connected in parallel to a first resistor among said plurality of series-connected resistors, for releasing said first resistor from short-circuiting in response to said ignition signal in order to switch over said impedance of differential circuit from a first impedance to a higher second impedance in response to said output signal from said discrimination circuit.

4. A differential protective relay apparatus according to claim 3, wherein said plurality of voltage detecting elements comprises: a first detection relay element connected to a tertiary winding of said voltage transformer of said first switching circuit; a second detection relay element connected in parallel to the secondary winding of said voltage transformer whose primary winding is connected in series to said plurality of resistors; a third detection relay element which discriminates the even-order harmonics; and a fourth detection relay element which is connected in parallel with the second resistor among said plurality of resistors and is responsive to a voltage across said second resistor or a current flowing in said second resistor.

5. A differential protective relay apparatus according to claim 3, wherein said harmonic ratio discrimination circuit comprises: a first resonance circuit which passes the fundamental component of the differential circuit input and blocks the even harmonic components thereof; and a second resonance circuit which blocks said fundamental component and passes said even harmonic components, said threshold circuit for outputting a signal which is proportional to a difference between the fundamental component and even harmonic components of the differential circuit input.

6. A differential protective relay apparatus according to claim 4, wherein said interlock circuit comprises: a first logical circuit which connects a normally-closed contact of said first detecting relay element in series to a normally-open contact of said second detection relay element; a second logical circuit which connects a normally-open contact of said first detecting relay element in series to a normally-open contact of said third detecting relay element; and a third logical circuit which is operated to open and close by a normally-open contact of said fourth detecting relay element, said first through third logical circuits being connected in parallel with each other.

7. A differential protective relay apparatus according to claim 6, wherein said interlock circuit is connected in series to a lock-out relay for tripping a breaker, and to a normally-closed contact of said lockout relay.

8. A differential protective relay apparatus according to any of claims 1 through 7 further comprising a second switching over circuit which switches over said impedance of said differential circuit based on the terminal voltage of said impedance.

9. A differential protective relay apparatus according to claim 8, wherein said second switching over circuit comprises: a voltage transformer, connected in parallel to said second resistor, for transforming a voltage across said second resistor; a ignition circuit, connected to a secondary winding of said current transformer, for producing an ignition signal in response to the second resistor voltage; and a switching device, connected in parallel to said series-connected resistors, for short-circuiting said plurality of resistors in response to said ignition signal, said second switching over circuit for switching over to a third impedance lower than said first impedance by short-circuiting said series-connected plurality of resistors upon detecting that said voltage across said second resistor exceeds a predetermined value.

* * * * *

UNITED STATES PATENT AND TRADEMARK OFFICE
CERTIFICATE OF CORRECTION

PATENT NO. : 5,095,399
DATED : March 10, 1992
INVENTOR(S) : Makoto Terada et al.

It is certified that error appears in the above-identified patent and that said Letters Patent is hereby corrected as shown below:

On the cover page, the first name of the second listed inventor is misspelled. "Yosuko" should be --Yosuke--;
in the Abstract, line 4, "imput" should be --input--.

Column 5, line 23, "$I_F$," should be --$I_F'$--;
line 33, "(iii" should be --(iii)--.

Column 7, line 41, "hormonic" should be --harmonic--.

Column 12, line 62, after "of" insert --said--.

Signed and Sealed this

Seventh Day of September, 1993

*Attest:*

BRUCE LEHMAN

*Attesting Officer*     *Commissioner of Patents and Trademarks*